United States Patent
Keller

(10) Patent No.: US 7,027,807 B2
(45) Date of Patent: Apr. 11, 2006

(54) METHOD FOR THE USER-INITIATED AUTOMATIC SUBSCRIPTION

(75) Inventor: Walter Keller, Ratingen (DE)

(73) Assignee: T-Mobile Deutschland GmbH, Bonn (DE)

( * ) Notice: Subject to any disclaimer, the term of this patent is extended or adjusted under 35 U.S.C. 154(b) by 237 days.

(21) Appl. No.: 10/181,539

(22) PCT Filed: Jan. 9, 2001

(86) PCT No.: PCT/DE01/00037

§ 371 (c)(1),
(2), (4) Date: Oct. 16, 2002

(87) PCT Pub. No.: WO01/54427

PCT Pub. Date: Jul. 26, 2001

(65) Prior Publication Data

US 2003/0119493 A1   Jun. 26, 2003

(30) Foreign Application Priority Data

Jan. 20, 2000   (DE) ............................... 100 02 216

(51) Int. Cl.
*H04M 3/00* (2006.01)

(52) U.S. Cl. .................. 455/419; 455/406; 455/409; 455/410; 455/411; 455/420; 455/435.1; 455/433; 455/558; 380/247

(58) Field of Classification Search .................. 455/409, 455/411, 419, 551, 418, 406–408, 410, 420, 455/435.1, 433, 558; 380/247
See application file for complete search history.

(56) References Cited

U.S. PATENT DOCUMENTS 5,077,790 A   12/1991   D'Amico et al.

(Continued)

FOREIGN PATENT DOCUMENTS

DE   197 52 970 A1   6/1999

(Continued)

OTHER PUBLICATIONS

J. Eberspacher and H.-J. Vogel, *GSM: Global System for Mobile Communication*, 2nd ed. Stuttgart / Leipzig: B. G. Teubner, 1999, pp. 35-57.

*Primary Examiner*—Stephen D'Agosta
(74) *Attorney, Agent, or Firm*—Myron Greenspan, Esq.; Lackenbach Siegel, LLP

(57) ABSTRACT

The inventive method enables existing contracts between a user and a telecommunications network operator to be enlarged by a user dialling into a customer subscription and administration server (CSAS). The access procedure of the existing contract relation is used for authenticating the user. The subscription of new contract components, such as clearing of a new terminal for instance that has been purchased by dispatch is carried out in a menu-controlled manner and by means of instruction texts and tactile inputs. The aim of the invention is to authenticate the calling user, authorise the additional contracts, changes and services which can be subscribed and administered by the corresponding user and store newly subscribed or changed contracts and services. The CSAS is connected to the corresponding data bases of the telecommunications network, such as CCBS, CDB and HLR. IP dialling options are optionally provided by means of the telecommunications network and/or the public internet. The inventive method, inter alia and especially, optimises procurement of a second or third appliance for family members or to be used as a pool appliance in small enterprises. Personal appearance at the POS involving passport control and the complicated procedures for setting up and verifying a contract can thus be avoided in the future.

6 Claims, 2 Drawing Sheets

U.S. PATENT DOCUMENTS

| | | | |
|---|---|---|---|
| 5,301,223 A * | 4/1994 | Amadon et al. | 455/409 |
| 5,301,234 A * | 4/1994 | Mazziotto et al. | 380/247 |
| 5,557,676 A * | 9/1996 | Naslund et al. | 380/247 |
| 5,572,571 A * | 11/1996 | Shirai | 455/551 |
| 5,742,910 A | 4/1998 | Gallant et al. | |
| 5,781,858 A | 7/1998 | Lantto et al. | |
| 5,794,141 A | 8/1998 | Zicker | |
| 5,794,142 A * | 8/1998 | Vanttila et al. | 455/419 |
| 5,887,249 A | 3/1999 | Schmid | |
| 5,956,636 A * | 9/1999 | Lipsit | 455/411 |
| 5,999,812 A | 12/1999 | Himsworth | |
| 6,014,561 A | 1/2000 | Molne | |
| 6,178,335 B1 * | 1/2001 | Vu | 455/558 |
| 6,301,484 B1 | 10/2001 | Rogers et al. | |

FOREIGN PATENT DOCUMENTS

| | | |
|---|---|---|
| DE | 198 57 210 A1 | 6/2000 |
| EP | 91 108 555.3 | 5/1991 |
| EP | 91 309 459.5 | 10/1991 |
| EP | 0 459 337 A1 | 12/1991 |
| EP | 0 481 714 A2 | 4/1992 |
| EP | 93 922 116.4 | 9/1993 |
| EP | 0 672 328 B1 | 9/1995 |
| JP | 8-140 136 | 5/1996 |
| WO | PCT/SE93/00784 | 9/1993 |
| WO | PCT/SE98/00573 | 3/1998 |
| WO | WO-9845002 * | 10/1998 |
| WO | PCT/US98/14660 | 2/1999 |
| WO | PCT/SE99/02418 | 12/1999 |

* cited by examiner

METHOD FOR THE USER-INITIATED AUTOMATIC SUBSCRIPTION

BACKGROUND OF THE INVENTION

1. Field of the Invention

The invention relates to a method for the subscriber-initiated automatic subscription and modification of signed subscription contracts, for the administration of existing services as well as for the enabling of end apparatus in telecommunication networks, for example cellular mobile communication networks, for at least owners of cellular system subscription accounts based on access data already available at the network and subscriber ends, such as subscriber call number and access codes.

2. Description of the Prior Art

The current method for enabling a subscriber device in cellular mobile communication networks, for example in a GSM network, takes place as described in the following. FIG. 1 serves for illustrating the sequence. A customer concludes at a vendors location (point of sale POS) a contract regarding the type, duration and payment of a subscriber contract with a mobile communication network operator (so-called mobile phone contract).

According to legal requirements in this connection an identity check is carried out after the personal identity card or the like has been presented. As a rule, this takes place at the time the contract is entered into. The end apparatus/mobile U.S. Patent Application of Walter Keller—Ser. No.: 10/181,539 Amendment—Art Unit: 2683 phone (to the extent such has been agreed) the customer takes home directly. However, as a rule, the customer cannot make a telephone call immediately.

From the point of sale (POS) the contract is conveyed to the mobile communication network operator. This is carried out in various ways, such as delivery by postal service, via Fax, Internet, Datex-P or the like. As the next step the contract is examined in the customer care area (CC) of the mobile communication network operator. Herein already existing signed contracts, misuse which might potentially have occurred, as well as the credit worthiness (solvency and payment ethics) of the potential customer are checked through optional access to an external credit worthiness data base (Schufa or the like). If the result is positive (no contract rejection), the required salient customer information (all identifying data required for the contract relationship) are created in the customer data base (CDB) of the customer care and billing system (CCBS).

The subscribed service is subsequently enabled and, as a rule, the customer receives a welcoming letter with user information.

The customer (GSM subscriber, subscriber S.S.) can now, in fact, use his new mobile telephone. A unique assignment of his subscriber call number (MSISDN) to the existing contractual subscription exists therein.

Most often there is an additional protection for the customer to prevent unauthorized use in the event the mobile phone is lost, which is of such type that the customer receives an additional code word which is required for switching on the end apparatus (personal identification number PIN). In the event the PIN is lost, the user is most frequently additionally given a further PIN, the co-called PUK (PIN Unblocking Key) for activating special network services. The latter is usually comprised of several characters and is not required for normal operation. It should be archived at the subscriber's end at a protected location in case it is needed. Each time a call is set up (or when the apparatus is switched on), the identifiers which are stored on the cell phone card (Subscriber Identification Module SIM) are verified against the input of the user and subsequently checked against the corresponding data in the GSM network. Herein the network refers back to the CCBS and the CDB. To accelerate the procedure, a portion of the network data are usually stored in the Home Location Register (HLR). If the subscriber has not transferred the mobile phone and PIN, identifying the end apparatus as well as the subscriber is thus possible with each call.

In this approach a two-stage identification and credit worthiness check is required when the contract is concluded and checked. However, it entails time-consuming and cost-intensive manual activities and thus leads to considerable disadvantages for all involved. The customer must be personally present at the POS, the sales personnel requires time for expensive and complicated discussions and carries out an identification card check. The CC process is also burdened with considerable expense and complexity.

In principle, there is no differentiation between whether or not the customer already has a signed subscription contract with the mobile communication network operator.

However, the potential for optimization is here given in the event a corresponding customer subscription already exists. In this case, all requirements for FüV [sic] and the credit worthiness check are already met and, in principle, verification of past payment ethics with the creation of the additional data sets in the customer data base are sufficient.

SUMMARY OF THE INVENTION

The present invention addresses the problem of providing a method on the basis of which a largely automated subscription and enabling together with determination of identity and credit worthiness check of additional end apparatus/services for owners of existing subscription accounts of cellular mobile communication networks is realized.

This problem is solved through the characterizing characteristics of patent claim 1.

The method according to the invention will be explained in the following with reference to FIG. 2.

DETAILED DESCRIPTION OF THE PREFERRED EMBODIMENTS

Figure 1:
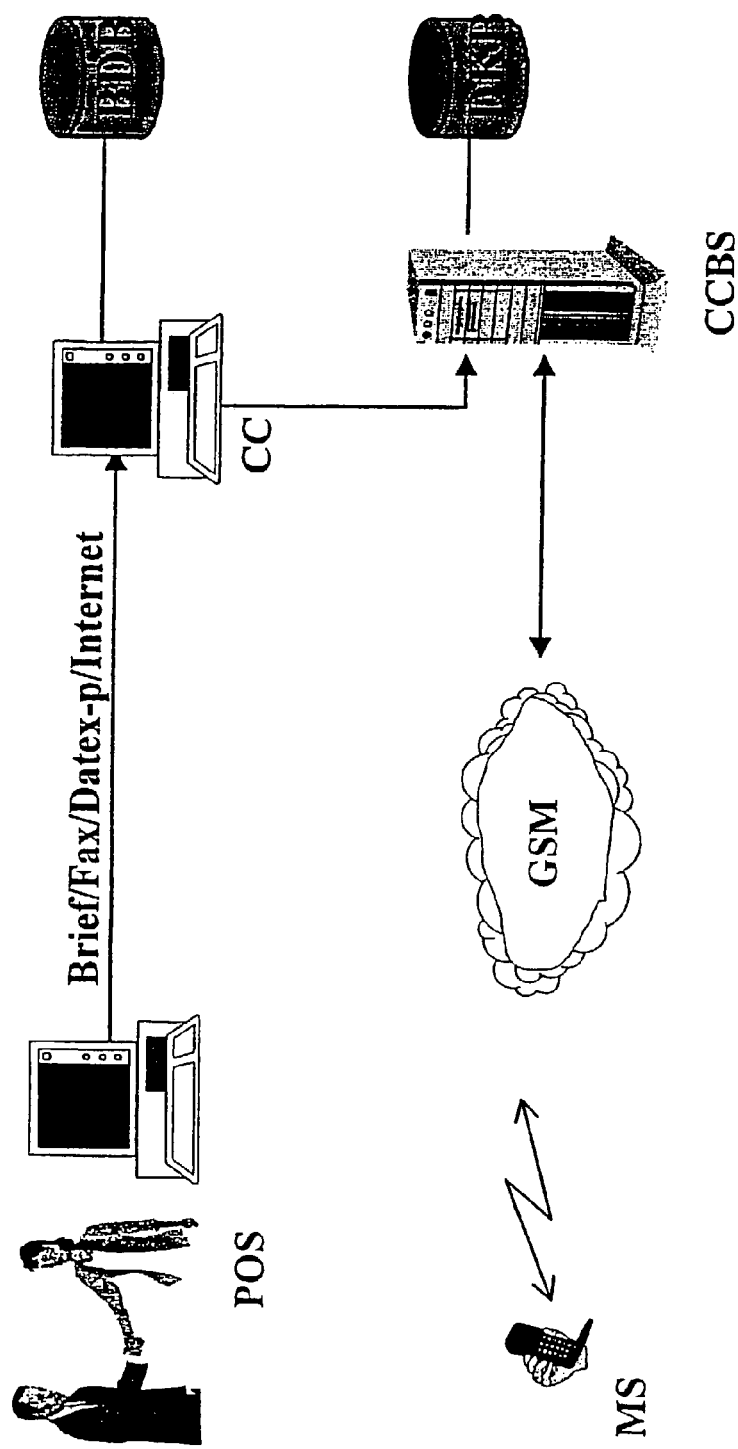
FIG. 1 is a schematic representation of a known method of enabling a subscriber device in a cellular mobile communications network, for example, a GSM network.
Figure 2:
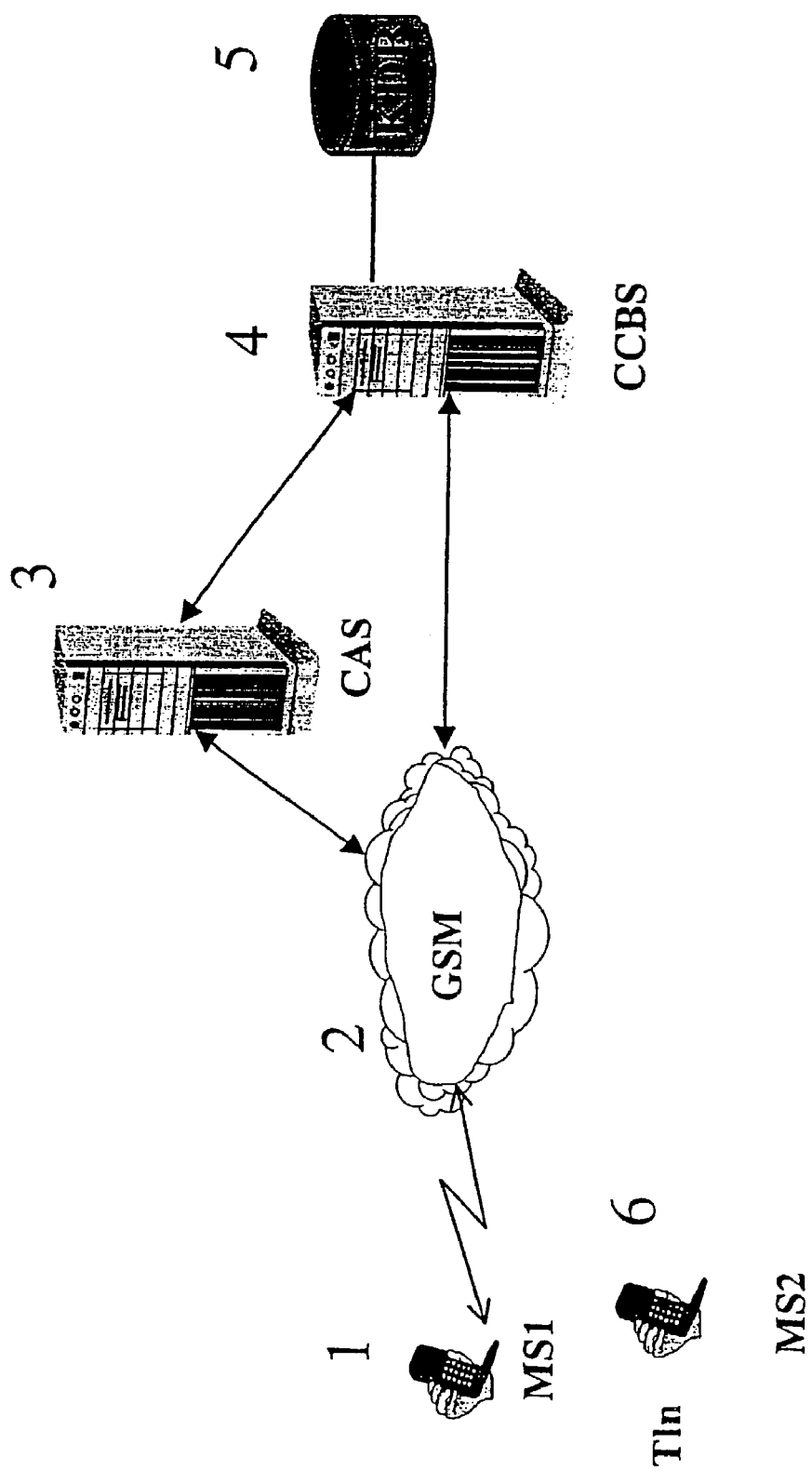
FIG. 2 is a method according to the invention for accomplishing the objectives shown in FIG. 1.

The customer is already in possession of the end apparatus MS1 (1).

He has obtained the end apparatus MS2 (6) by mail order, by freely purchasing such or the like.

An existing customer (subscriber Sbs) of a cellular GSM mobile communication network, whose customer data are already stored in the CDB (5) of the mobile communication network, wishes to conclude an additional subscription contract or requires a further end apparatus. The reasons for this are manifold, for example motor vehicle or boat installation of a second apparatus, temporary utilization by family members, the use as pool apparatus in small enterprises, etc.

As a further step, the enabling of the newly acquired end apparatus, together with the new card, takes place wherein inter alia voice control or also other input methods and means are applied. During the procedure, after prompting by the network end Customer Subscription and Administration Server (CSAS), the identifying data of the second apparatus, such as MSISDN, PIN, PUK or the like are called up, wherein it is possible to apply different input methods and media, inter alia also keyboards. After entering the corresponding values listed above, the type of the contract, its duration and further contract parameters can be selected with the help of menus.

An alphanumeric name, optionally assigned to the second apparatus, such as for example wife, son, apparatus 2, customer service and the like, serves for the simple subsequent differentiation of the accrued costs on the call charging bill.

The C-Server is connected with the CCBS (4) for the automatic verification of the contractual subscription. An optional additional parameter in the customer data base (5) regulates at the network operator's end the validity of the customer end subscriptions and administrations, as in this case. On this basis, the CSAS, if appropriate, detects that a desired additional contractual subscription is not possible. In the last mentioned case a corresponding message is output with reference to the CC call number.

SUMMARY OF THE INVENTION

After the subscription process has been completed and acknowledged at the subscriber end, the automatic creation of the additional customer data in the customer data base of the CCBS takes place as well as, if needed, in further network devices. Once this is also completed, the new card is automatically enabled and the customer can directly communicate with his second apparatus (6) utilizing the associated new card.

Confirmation of the contract expansion by postal service or optionally fax delivery takes place. Completion of the subscription or administration via the Internet to the CAS should optionally also be provided.

The invention claimed is:

1. Method for the subscriber-initiated automatic subscription and modification of contractual subscriptions, for the administration of existing services including the enabling of end apparatus in telecommunication networks, cellular mobile communication networks, for owners of existing subscription accounts, based on contract and access data, such as subscriber call number and access codes, already available at the network and subscriber end, by automated enabling of additional SIM cards and/or end apparatus only for existing subscribers with already available signed subscription contracts, wherein existing contract and access data stored at the network end are expanded in an automatic method after subscriber dialing into a corresponding subscription device (Customer Subscription and Administration Server CSAS) by the identifying data of the new contract components, wherein for the expansion of the existing contract data by the identifying data of the new contractual subscription, a menu-driven user guidance through the CSAS takes place, with the input of the data taking place by known input techniques (including tactile, by acoustic signal, by infrared signal) and the user guidance takes place utilizing known technical output means (including visual display, voice output), and wherein the CSAS for the authentication of the calling subscriber, for the authorization/verification of the addition contracts, modifications and services, which can be subscribed by the particular subscriber and administered, as well as for storing newly subscribed or modified contracts and services, is connected with the corresponding data bases of the telecommunication network, including CCBS, CDB and HLR.

2. Method as claimed in claim 1 characterized in that for the subscriber CSAS access the access mechanisms of the existing subscription contract are utilized as subscriber identification and the identifying data of the new contractual subscription take place for the expansion of the existing subscription contract.

3. Method as claimed in claim 1 characterized in that the CDB of the telecommunication network is optionally expanded by the necessary data sets, which are required for the control of the user-initiated automatic subscription and administration processes (ASA), including prohibition of the ASA, extent, limits, as well as internal parameters, identifying creditworthiness of the network operator.

4. Method for the subscriber-initiated automatic subscription and modification of contractual subscriptions, for the administration of existing services including the enabling of end apparatus in telecommunication networks, cellular mobile communication networks, for owners of existing subscription accounts, based on contract and access data, such as subscriber call number and access codes, already available at the network and subscriber end, by automated enabling of additional SIM cards and/or end apparatus only for existing subscribers with already available signed subscription contracts, wherein existing contract and access data stored at the network end are expanded in an automatic method after subscriber dialing into a corresponding subscription device (Customer Subscription and Administration Server CSAS) by the identifying data of the new contract components, wherein for the expansion of the existing contract data by the identifying data of the new contractual subscription, a menu-driven user guidance through the CSAS takes place, with the input of the data taking place by known input techniques (including tactile, by acoustic signal, by infrared signal) and the user guidance takes place utilizing known technical output means (including visual display, voice output), and wherein the CSAS access takes place via the Internet Protocol and graphic user interfaces, wherein the access takes place via the particular telecommunication network utilizing the available network-specific access and authentication procedures as well as optionally additional protection mechanism, including one-time passwords.

5. Method for the subscriber-initiated automatic subscription and modification of contractual subscriptions, for the administration of existing services including the enabling of end apparatus in telecommunication networks, cellular mobile communication networks, for owners of existing subscription accounts, based on contract and access data, such as subscriber call number and access codes, already available at the network and subscriber end, by automated enabling of additional SIM cards and/or end apparatus only for existing subscribers with already available signed subscription contracts, wherein existing contract and access data stored at the network end are expanded in an automatic method after subscriber dialing into a corresponding subscription device (Customer Subscription and Administration Server CSAS) by the identifying data of the new contract components, wherein for the expansion of the existing contract data by the identifying data of the new contractual subscription, a menu-driven user guidance through the CSAS takes place, with the input of the data taking place by known input techniques (including tactile, by acoustic signal, by infrared signal) and the user guidance takes place utilizing known technical output means (including visual display, voice output), and wherein, in an alternative realization, method the CSAS access takes place optionally with the use of Internet Protocol and graphic user interface via the public Internet, wherein, due to the absence of network-specific access and authentication procedures, the subscriber authentication takes place in substitution by additional access rights, which are provided especially for such cases between subscriber and telecommunication network operator (access code, one-time passwords).

6. Method for the subscriber-initiated automatic subscription and modification of contractual subscriptions, for the administration of existing services including the enabling of end apparatus in telecommunication networks, cellular mobile communication networks, for owners of existing subscription accounts, based on contract and access data, such as subscriber call number and access codes, already available at the network and subscriber end, by automated enabling of additional SIM cards and/or end apparatus only for existing subscribers with already available signed subscription contracts, wherein existing contract and access data stored at the network end are expanded in an automatic method after subscriber dialing into a corresponding subscription device (Customer Subscription and Administration Server CSAS) by the identifying data of the new contract components, wherein for the expansion of the existing contract data by the identifying data of the new contractual subscription, a menu-driven user guidance through the CSAS takes place, with the input of the data taking place by known input techniques (including tactile, by acoustic signal, by infrared signal) and the user guidance takes place utilizing known technical output means (including visual display, voice output), and wherein optionally alphanumeric alias names for additional SIM cards /end apparatus can be defined, which, inter alia, serve for apparatus identification and transparency of the telephone bill.

* * * * *